United States Patent [19]
Takeda

[11] Patent Number: 5,473,477
[45] Date of Patent: Dec. 5, 1995

[54] AUDIO DATA REPRODUCING DEVICE FOR REPRODUCING DIGITAL VOICE SIGNALS ON A MAGNETIC TAPE AT A DIFFERENT SPEED THAN THE SPEED AT WHICH THE SIGNALS ARE RECORDED

[75] Inventor: Takayuki Takeda, Kanagawa, Japan

[73] Assignee: Sony Corporation, Tokyo, Japan

[21] Appl. No.: 37,426

[22] Filed: Mar. 26, 1993

[30]  Foreign Application Priority Data

Mar. 30, 1992 [JP] Japan .................................. 4-102476

[51] Int. Cl.⁶ ...................................................... H04N 5/78
[52] U.S. Cl. ........................ 360/10.3; 360/33.1; 360/36.1
[58] Field of Search ........................... 360/10.1, 10.3, 360/71, 72.1, 72.3, 19.1, 36.1, 8.33.1; 358/335, 337, 339, 343

[56] References Cited

U.S. PATENT DOCUMENTS

| | | | |
|---|---|---|---|
| 4,587,573 | 5/1986 | Odaka | 360/19.1 X |
| 4,647,985 | 3/1987 | Yokosawa | 360/10.1 X |
| 4,800,447 | 1/1989 | Toba | 360/10.3 |
| 5,060,077 | 10/1991 | Koya et al. | 360/10.1 X |
| 5,223,987 | 6/1993 | Müller | 360/10.3 |

Primary Examiner—Andrew L. Sniezek
Attorney, Agent, or Firm—William S. Frommer; Alvin Sinderbrand

[57] ABSTRACT

An audio data reproducing device for reproducing digital voice signals from slanted tracks formed on a magnetic tape which is run at a speed different from a speed used for writing, comprising a unit for running the magnetic tape at a predetermined speed, and a playback rotary magnetic head adapted to be moved by a head moving unit in a direction of crossing the slanted tracks to effect follow-up tracing of the slanted tracks for reproducing signals recorded on the slanted tracks even if the magnetic tape is run at a speed different from the writing speed. The device includes a memory for storing audio data read out from the slanted tracks and a digital signal processor (DSP) for generating, in the low-speed playback mode, write address data for causing audio data recorded on a slanted track traced by the magnetic head to be captured in the memory only when the slanted track traced by the magnetic head is new. The digital signal processor also transmits readout address data conforming to playback speed to the memory to process audio data read out from the memory in accordance with the readout address with Lagrange interpolation. A clear sound conforming to the low-speed playback is produced on the real-time basis during the low-speed playback mode, while no sound is produced during still playback.

7 Claims, 11 Drawing Sheets

AUDIO DATA REPRODUCING DEVICE FOR REPRODUCING DIGITAL VOICE SIGNALS ON A MAGNETIC TAPE AT A DIFFERENT SPEED THAN THE SPEED AT WHICH THE SIGNALS ARE RECORDED

BACKGROUND OF THE INVENTION

This invention relates to an audio data reproducing system or device for a digital VTR having a function of signal reproduction at differential speeds, i.e. at tape speeds different from the normal tape speed. The device of the present invention may be employed in, for example, a composite digital VTR according to a D-2 format.

Figure 1:
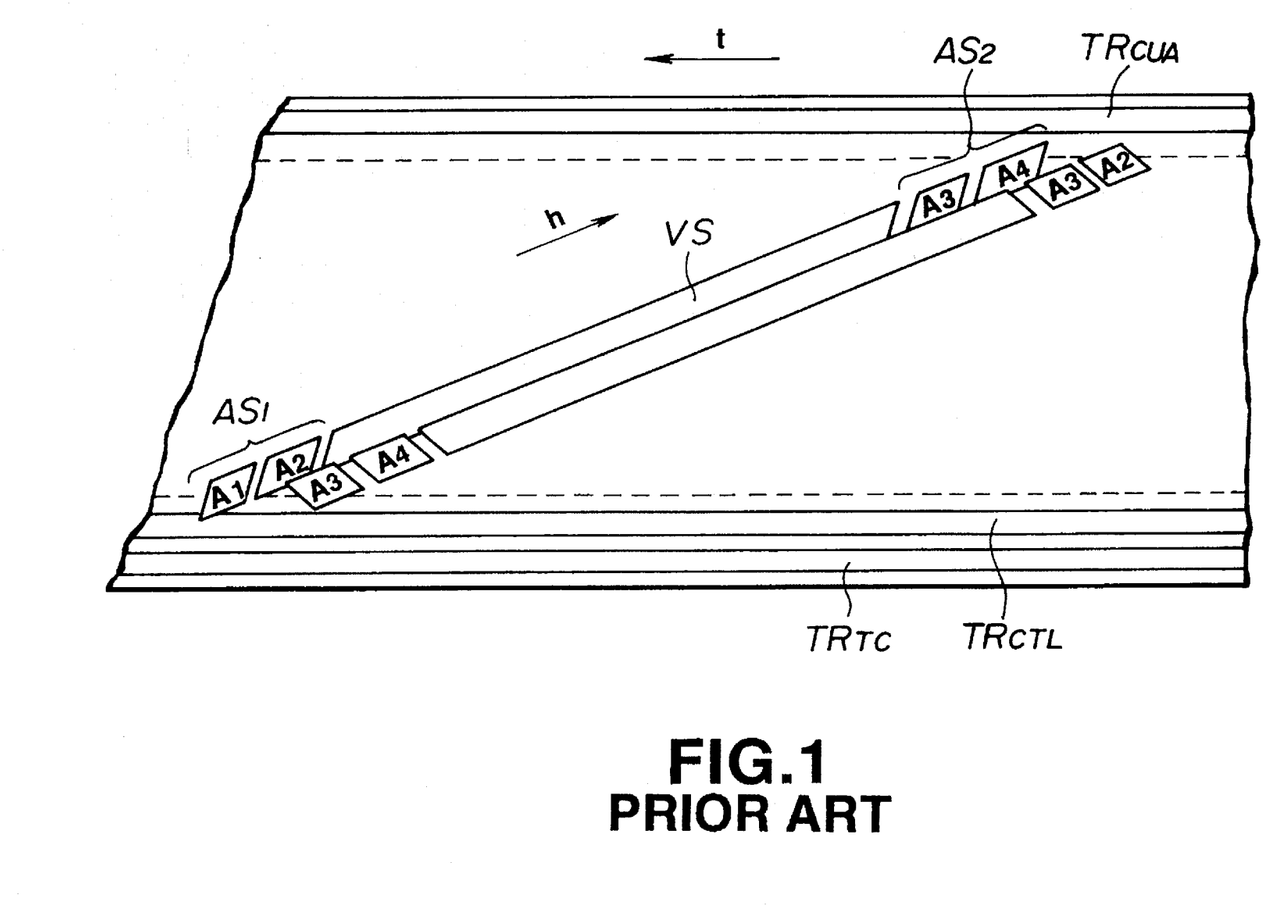
FIG. 1 is an explanatory view showing a track format of a D-2 standard digital VTR.

The D-2 standard format for a digital VTR provides for three longitudinal tracks, namely a time code track $TR_{TC}$ for recording time code signals, a control track $TR_{CTL}$ for recording control signals providing servo reference and a cue audio track $TR_{CUA}$ for recording cue audio signals for editing, and a slanted track $TR_{PRG}$ for recording digital video signals and digital audio signals, as shown in FIG. 1. The single slanted track $TR_{PRG}$ is constituted by a central video sector VS and audio signal sectors $AS_1, AS_2$ ahead and back of the central sector VS.

In the D-2 format digital VTR, 1-field digital video signals are recorded, along with digital audio signals, by 3 segments or 6 tracks by two pairs of recording rotary magnetic heads mounted on a rotary drum at an angular interval of 180°, while the digital video signals and digital audio signals, recorded in this manner on the recording tape, are reproduced by two pairs of playback rotary magnetic heads mounted on the rotary drum at an angular interval of 180°.

In general, in a helical-scan video tape recorder for recording/reproducing video signals on or from slanted tracks on the magnetic tape, it is necessary for a playback rotary magnetic head to trace the slanted track correctly. Consequently, dynamic playback control is performed for differential speed playback in which a playback rotary magnetic head, or a so-called dynamic tracking head (DT head), is moved in a direction of traversing the slanted track on the magnetic head by a head moving unit employing an electro-mechanical transducer, such as a bimorph.

Meanwhile, in analog VTR, the playback sound conforming to the playback image may be produced even during differential speed playback by reproducing audio signals recorded on a longitudinal audio track.

On the other hand, in a digital VTR according to the above-mentioned D-2 standard in which audio signals are also digitized and recorded/reproduced as PCM audio signals, video data and audio data recorded on the slant, ed track are read and reproduced during the low-speed playback mode of reproducing recorded data at a speed lower than a normal playback speed. Consequently, during the low-speed playback mode, the same slanted track is to be repeatedly traced by the DT head. The result is that, in the case of the digital VTR, the voice cannot be reproduced so smoothly as in the case of sound recorded on the longitudinal audio track of the analog VTR.

That is, in digital VTR, the picture and the sound are repeatedly obtained for each field or frame. In conventional digital VTR, the audio data obtained repeatedly in this manner is decoded and directly outputted, so that a continuous block of sound, that is the lump-like sound for each field or frame, is heard repeatedly, whereas a similar sound is also reproduced during still playback.

SUMMARY OF THE INVENTION

In view of the above-depicted status of the art, it is an object of the present invention to provide an audio data reproducing device for a digital VTR whereby the sound conforming to the low playback speed may be obtained during the low-speed playback mode and no sound is reproduced during still playback.

The audio data reproducing device according to the present invention has the function of a differential speed reproduction by e.g. a dynamic tracking head, and is adapted for reproducing audio data recorded in slanted tracks on a magnetic tape. The audio data reproducing apparatus for a digital VTR includes a memory for storing audio data read out from a slanted track on the magnetic tape, on the block-by-block basis, wherein a block may be a field or a frame, a write address generating unit for generating, during the low-speed playback mode of reproducing the audio data recorded on the slanted track on the magnetic tape at a speed lower than the normal playback speed, write address data for causing audio data recorded on a slanted track traced by the magnetic head to be captured in the memory only when the slanted track traced by the magnetic head is new, a readout address generating unit, for transmitting readout address data conforming to the playback speed for the low-speed playback mode to the memory, and an interpolating unit for processing the vice data read out from the memory responsive to the readout address data with predetermined interpolation, such as a so-called Lagrange interpolation or linear interpolation.

With the audio data reproducing device for a digital VTR according to the present invention, only the audio data read out from a new slanted track is stored in the memory and the audio data stored in the memory is read out responsive to the playback speed to process the read out audio data with predetermined interpolation, so that there is no possibility of the same sound being repeatedly reproduced, while the sound conforming to the prevailing playback speed is obtained.

Other objects and advantages of the present invention will become apparent from the following description of the preferred embodiments and the claims.

DETAILED DESCRIPTION OF THE PREFERRED EMBODIMENT

The audio data reproducing device for a digital VTR according to the present invention includes a function of differential speed reproduction which is achieved by employing a dynamic tracking head or DT head, and is adapted for reproducing audio data recorded on slanted tracks on a magnetic tape, as shown in FIG. 1. The audio data reproducing device for VTR includes a digital signal processor (DSP) 11 and a memory 12 as storage means for storing e.g. five fields of audio data read out from the slanted track on the magnetic tape with a predetermined block, herein a field, as a reading unit. The DSP 11 has the function of write address generating means for generating write address data for storing audio data recorded on a new slanted track in memory 12 only when the DT head traces the new slanted track in the course of the low-speed playback mode of reproducing the audio data recorded on the slanted track at a speed lower than a standard playback speed. The DSP 11 also has the functions of readout address generating means for transmitting readout address data conforming to the playback tape speed during the low-speed playback mode, and interpolating means for processing the audio data read out from memory 12 in accordance with the readout address data with predetermined interpolation, such as Lagrange interpolation or linear interpolation.

It is noted that, since audio data which cannot be traced by the DT head, can naturally not be reproduced, a tape speed in excess of the standard speed is not considered in the present embodiment.

Figure 2:
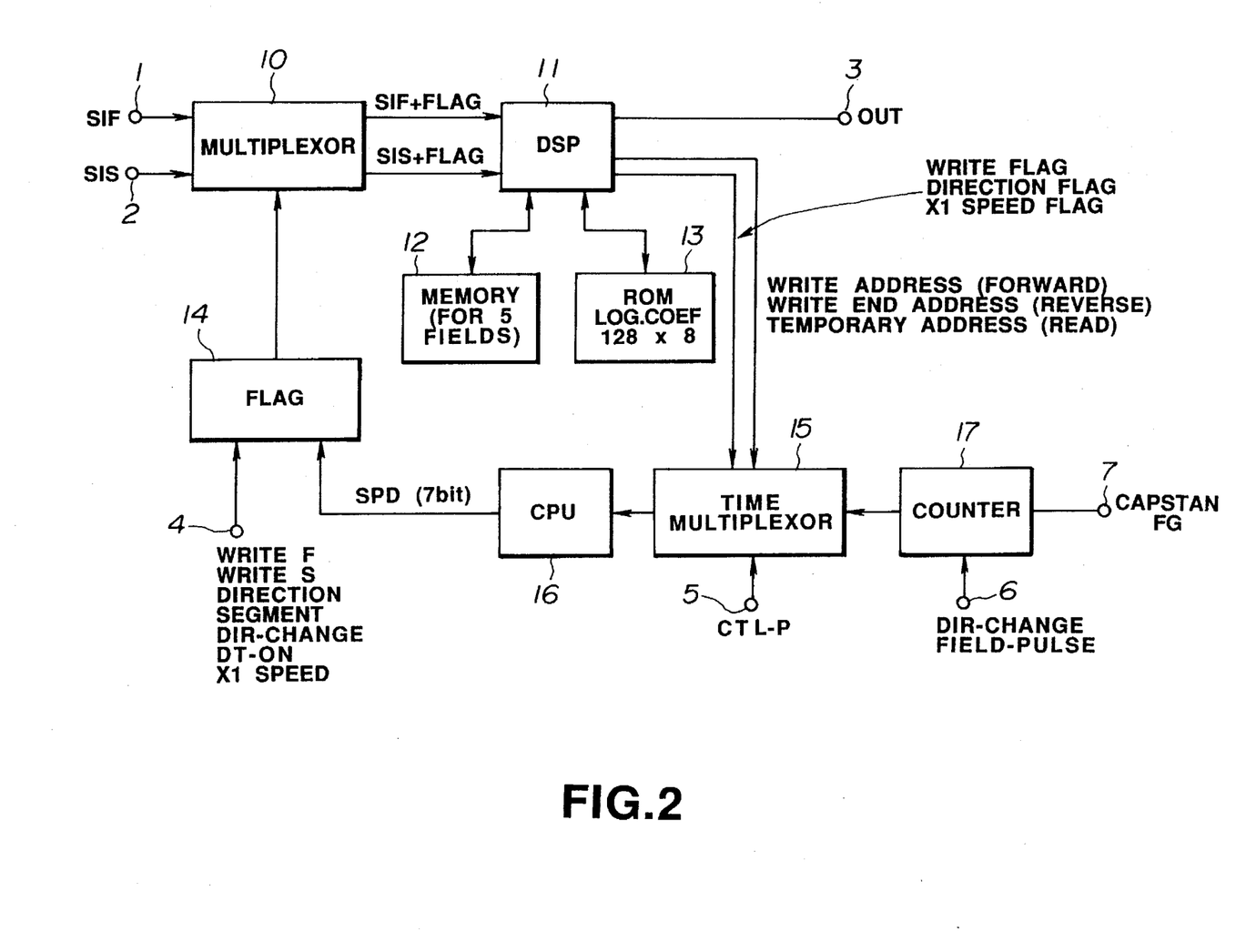
FIG. 2 is a block circuit diagram showing an arrangement of an audio data reproducing device for a digital VTR according to the present invention.

In the arrangement shown in FIG. 2, a first copy signal SIF and a second copy signal SIS for the D-2 standard digital VTR are supplied as serial input audio data to input terminals 1 and 2, respectively.

The audio data of the first copy signal SIF and the second copy signal SIS are both supplied to a multiplexor 10 where ID flags as later explained are appended to the signals SIF and SIS. Outputs of the multiplexor 10 are supplied to DSP 11.

DSP 11 causes the audio data to be stored in memory 12 on the field-by-field basis or on the frame-by-frame basis. Besides, DSP 11 sequentially accesses the audio data stored in memory 12 depending on the tape speed and processes the audio data with Lagrange interpolation using Lagrange coefficients held in the form of a table in a ROM 13, for example, 128 8-bit words in case of performing 8-dimensional Lagrange interpolation, before outputting the interpolated data at terminal 3 as output audio data. Details of DSP 11 will be explained subsequently.

The above-mentioned tape speed may be calculated by counting the number of pulses of a capstan FG supplied via terminal 7.

That is, the pulses of the capstan FG supplied to terminal 7 are transmitted to a counter 17 which counts the number of pulses of the capstan FG to output a count value. The counter 17 is reset based on a detection change pulse indicating changes in the tape running detection, supplied via terminal 6, and a field pulse indicating each field, similarly supplied via terminal 6.

The count value from counter 17 is supplied to a multiplexor 15, which superimposes on the count value a write address based on which audio data were written in memory 12 during forward playback, a write-end address which is the last address value based on which audio data were written in memory 12 during reverse playback, a temporary address which is a read address of the current location of memory 12, a write flag indicating that the DT head is tracing a track of a new field, a direction flag indicating whether the tape running direction is the forward detection or the reverse direction, a x1 speed flag indicating that the tape speed is x1 speed, that is the normal or standard playback speed, and a control pulse CTL-P recorded on a control track of the tape, or a pulse transmitted for each one-third of each field, and transmits the superimposed signal to a central processing unit (CPU) 16. It is noted that the control pulse CTL-P is supplied via terminal 5, while the data other than the pulse CTL-P, that is the above-mentioned addresses or flags, are supplied from DSP 11.

CPU 16 generates and outputs 7-bit speed data (tape speed data) SPD based on the count value outputted from time multiplexor 15, the various flags and the control pulse. Meanwhile, CPU 16 checks if the current speed data is correct, while comparing readout and write addresses of audio data from and to memory 12 to correct the speed data so that readout from memory 12 is not overlapped with writing in memory 12.

The speed data SPD from CPU 16 are supplied to a flag generating circuit 14. The flag generator 14 transmits the speed data SPD, a timing signal for writing the first copy signal SIF in memory 12 (write F), a timing signal for writing the second copy signal SIS in memory 12 (write S), a direction signal indicating the tape running direction, a signal indicating the time instant when the tape running direction has been changed (Dir-change signal), a signal indicating that the DT head has correctly traced the slanted track (DT-on signal), and a signal indicating a field in which 800 samples have been recorded (segment signal) as flags to multiplexor 10.

It is noted that, since audio signals are synchronized for five fields of video signals in the case of the NTSC system digital VTR, 801 samples are recorded in each of four fields and 800 samples are recorded in a fifth field. Consequently, the above segment signal indicating the field in which 800 samples have been recorded is transmitted to the flag generating circuit 14.

Meanwhile, the above-mentioned timing signals write F and write S are generated in a circuit, not shown, based on the control pulse CTL-P and a capstan signal FG. That is, by the control pulses CTL-P and the capstan signal FG, the current position in each field of the tape being reproduced is discriminated and, based on the information of the current position, the timing of the DT head tracing a new track of a new field is indexed. It is at this indexed timing that the timing signals write F and write S are generated. Thus the timing signals write F and write S are signals indicating that the DT head is to trace a new track of a new field.

The signals on which the various flags are superimposed at the multiplexor 10 are supplied to DSP 11 which then causes addresses for memory 12 to be generated based on the above flags to cause audio data to be recorded in memory 12. DSP 11 then causes the data written in memory 12 to be read out at a rate conforming to the tape speed and processed with e.g. an 8th order Lagrange interpolation.

Figure 3:
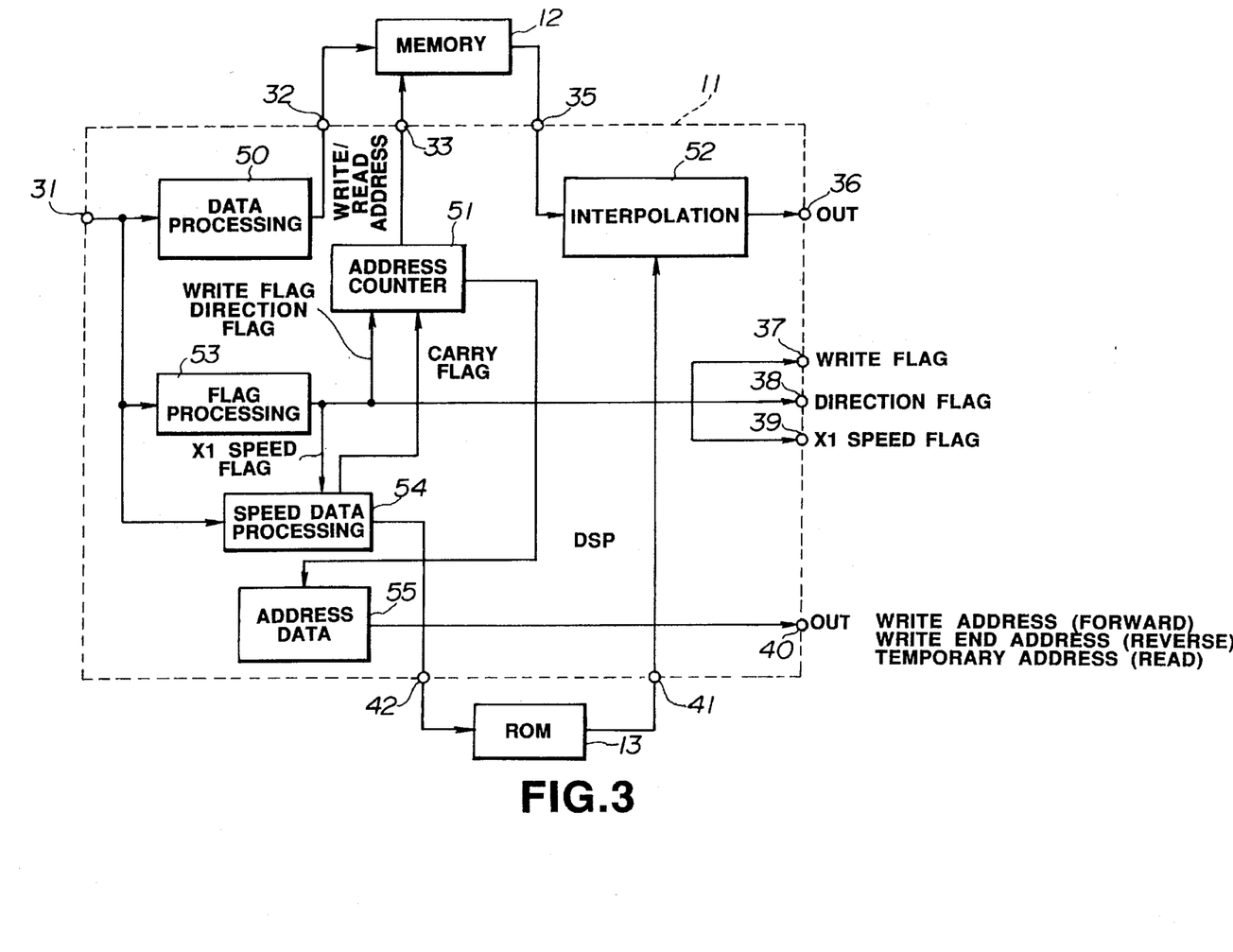
FIG. 3 is a block circuit diagram showing an arrangement of a digital signal processor (DSP) of the digital VTR according to the present invention.

FIG. 3 shows a more concrete arrangement of DSP 11, memory 12 and ROM 13.

In this figure, data from multiplexor 10 shown in FIG. 2 are supplied at terminal 31. Only one of signals entered to multiplexor 10 is shown in FIG. 3. Terminals 32, 33 and 35 are the input/output terminals to and from memory 12, while terminals 41, 42 are input/output terminals to or from ROM 13. Terminal 36 corresponds to terminal 3 of FIG. 1, while terminals 37, 38 and 39 are connected to an input terminal of multiplexor 15 of FIG. 2.

The serial data supplied to terminal 31, that is audio data on which the flags are superimposed, are transmitted to a data processor 50, a flag processor 53 and to a speed data processor 54.

The data processor 50 is a block for capturing the serial data supplied via terminal 31.

The speed data processor 54 captures 7-bit speed data from flag portions of the serial data for outputting speed data as read addresses for ROM 13 in which the pulse signals for generating readout addresses for memory 12 and Lagrange coefficients are stored. Meanwhile, the speed data remain the same during a one- field interval. That is, the speed data is not changed from word to word.

Figure 13:
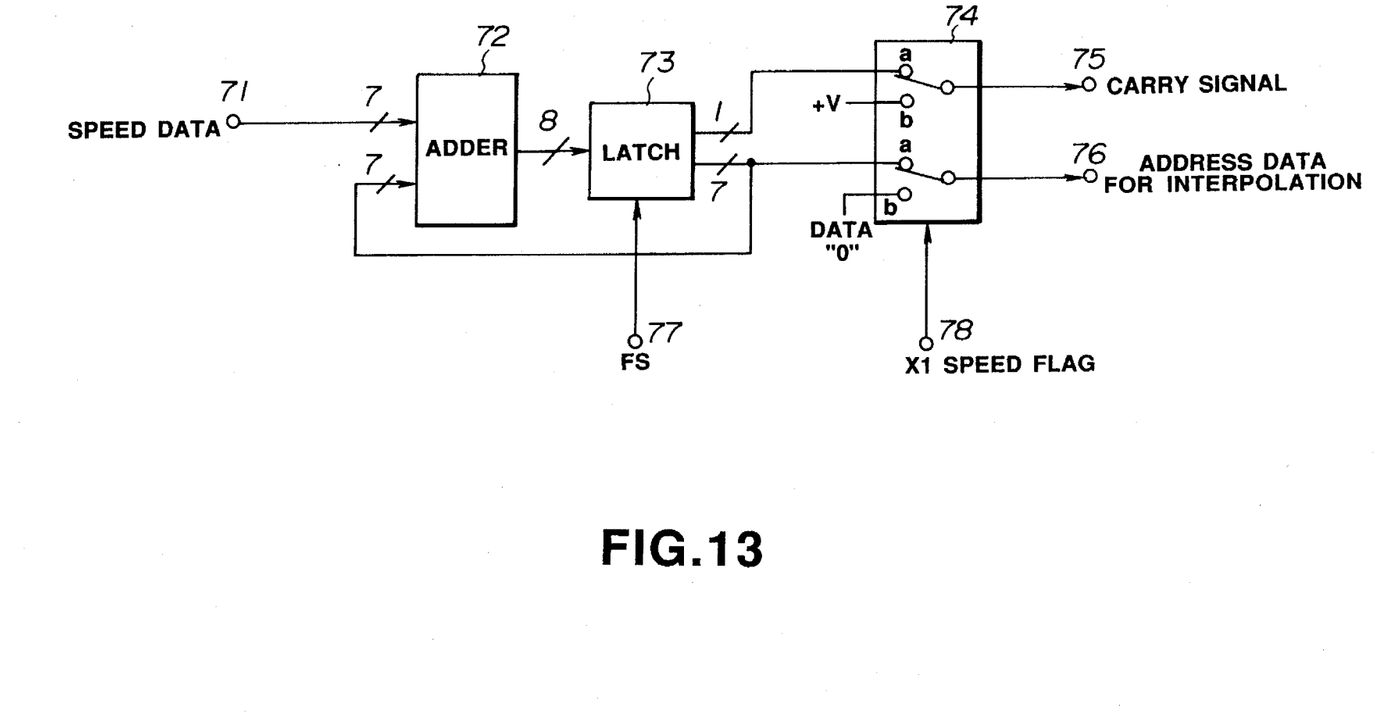
FIG. 13 is a block diagram showing an arrangement of a speed data processor.

FIG. 13 shows an arrangement of the speed data processor 54.

The 7-bit speed data, entered at terminal 71, is supplied to one input A of an adder 72, to the other input B of which lower 7-bit data of the 8-bit output of the adder 72, latched by a latch circuit 73, is supplied. The clock signal of the latch circuit is a signal of the sampling frequency FS supplied from terminal 77. With the present speed data processor 54, the speed data for a 1X speed (normal speed) is set to 128 decimal. An output of the latch circuit 73 is supplied to a selector 74 selectively controlled by x1 speed flag so that the upper most bit of the 8 bits and 7 lower most bits of the output of the latch circuit 73 are outputted as carry signals and as address data for interpolation, respectively. If, when the low-speed speed data, such as 64 decimal indicating x0.5 speed, is supplied to input A of adder 72, to the input B of which 0 decimal is supplied from latch circuit 73, a clock signal FS is supplied to terminal 77, the output of adder 72, which is 64 decimal, is latched by latch circuit 73. The upper most bit of the 8-bit output of the adder 72, used as carry signal, is not outputted when the adder 72 outputs 64 decimal. When 64 decimal outputted from latch circuit 73 is supplied to input B of adder 72, the result of addition becomes equal to 128 decimal, so that the lower 7 bits of the output of adder 72 are equivalent to 0 decimal and only the 8th bit carry signal is outputted, with the carry signal and the speed data "0" being latched in latch circuit 73. Thus, if the speed data indicates x0.5 speed, the carry signal outputted by latch circuit 73 is a signal which is inverted for each clock signal FS, that is, it is equivalent to a signal having a frequency one-half that of the clock signal FS. Consequently, if the speed data at the input A of the adder 72 indicates a speed not higher than x1 speed, the carry signal outputted via selector 74 is a signal having a frequency equal to a fraction of the frequency of the clock signal FS, depending on the speed data.

This carry signal is used as a pulse signal for generating a read address for memory 12. The lower 7 bits of the output of the latch circuit 73 is transmitted via selector 74 to ROM as address data for interpolation.

Meanwhile, selector 74 selects the fixed terminal a if the x1 speed data is not generated. If the x1 speed data is generated, selector 74 selects the fixed terminal b, such that a fixed level dc signal +V is outputted at a terminal 75, while a signal indicating data "0" is outputted as address data for interpolation at terminal 76.

The reason the output is changed over by the x1 speed flag is that, since the sped data at the normal speed of reproduction is not necessarily stabilized, it is necessary to fix the period of the readout address for memory 12 without proceed to interpolation.

The flag processor 53 is a block for checking various flags. The flag processor 53 outputs a write flag when the DT head has traced a new track of a new field. This write flag is outputted responsive to occurrence of the timing signal write F instructing the first copy signal SIF to be written in memory 12 and the timing signal write S instructing the second copy signal SIS to be written in memory 12. Meanwhile, the write flag is not outputted when the DT-on flag is not set because then the DT head is regarded as not correctly tracing the track. The write flag is formed from the timing signals write F or write S. Although it is not shown from which of these signals the write flag is formed, one of these signals is selected responsive to the error rate of the respective copy data.

The direction flag from flag processor 53 is a flag for checking if the current tape running direction is the forward direction or the reverse direction. The x1 speed flag is a flag set only for x1 speed for permitting write and read operations for memory 12 because the speed data for normal speed playback is not necessarily stabilized. It is noted that the memory 12 has to be accessed for the x1 speed as well.

The function of address controller 51 is to increment the current write address if the write address is set in data supplied via terminal 43 to generate an address to cause data to be written in memory 12 and to generate a read address by carry signal outputted from speed data processor 54 to cause data to be read out from memory 12 at a timing conforming to the tape speed. Also, if the carry signal is at a fixed level, address control let 51 generates a read address which is changed at a fixed timing from one address to another.

An address data processor 55 sequentially monitors read address values of memory 12 obtained from the above-mentioned speed data to output the read address of the current location (temporary address) at all times in order for the downstream side CPU 16 to check if the read address for memory obtained from the speed data is within the range of data written in memory 12. If the access speed is increased, access is had to a portion devoid of data, so that the reproduced sound is disturbed. Conversely, if the access speed is too low, the voice is delayed with respect to the picture. Consequently, as for a ring memory for storing five fields, reading is overlapped with new writing, so that congruent sound reproduction is not achieved. For this reason, both the read address for the current memory location (temporary address) and write address (write end address for reverse playback) are supplied to downstream side CPU 16 in order for CPU 16 to control the speed data based on the results of comparison of the read and write addresses.

In an interpolation processor 52, supplied with an output of memory 12, data of memory 12 to be accessed is determined by the speed data and taken out from memory 12. Since the 8th order Lagrange interpolation is employed in the present embodiment, eight data are required. However, since an internal memory within DSP 11 is employed, it suffices to take out only one word from memory 12. The data is multiplied by a Lagrange coefficient written in ROM 13 similarly accessed by the speed data to form interpolation signals.

The Lagrange interpolation is hereinafter explained. In the interpolation processor 52, audio data sequentially read out from memory 12 are multiplied by 8th order Lagrange coefficients and the resulting audio data are summed together. Specifically, in the interpolation processor 52, the interval between adjacent samples of the audio data obtained on sampling at 48 kHz is divided into 127 parts. Each four fore and aft samples are multiplied by Lagrange coefficients for weighting in accordance with the Lagrange interpolation theory and the resulting samples are summed together to generate 128 interpolation data.

In the embodiment illustrated, the operation of writing audio data in memory 12 and simultaneously reading the audio data from memory 12 is realized in the following manner.

For writing the audio data in memory 12, write addresses are generated for a predetermined time period for writing the data in memory 12. The predetermined time period is a new one-field period to which the DT head newly proceeds. Therefore, in the embodiment illustrated, if the DT head is tracing the same site, that is the same slanted track, a number of times, data are captured only during the first tracing operation, while no data are captured during the second and subsequent tracing operation.

Figure 4:
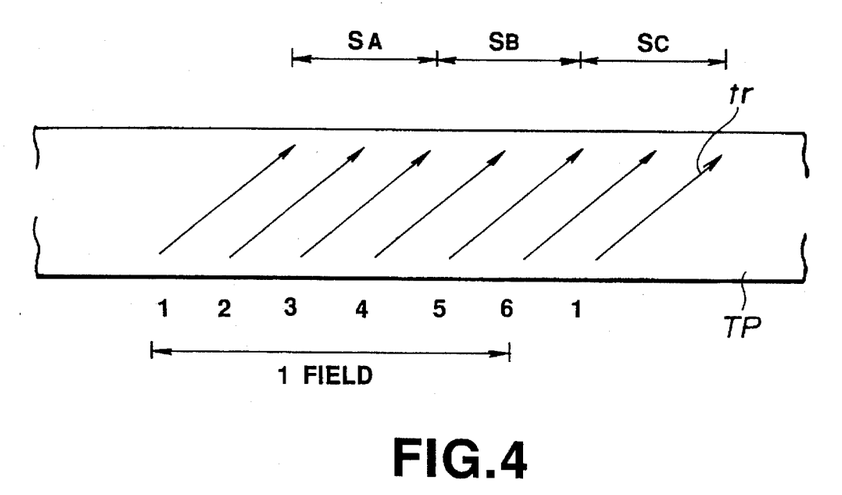
FIG. 4 is an explanatory view showing track patterns and segments.
Figure 5:
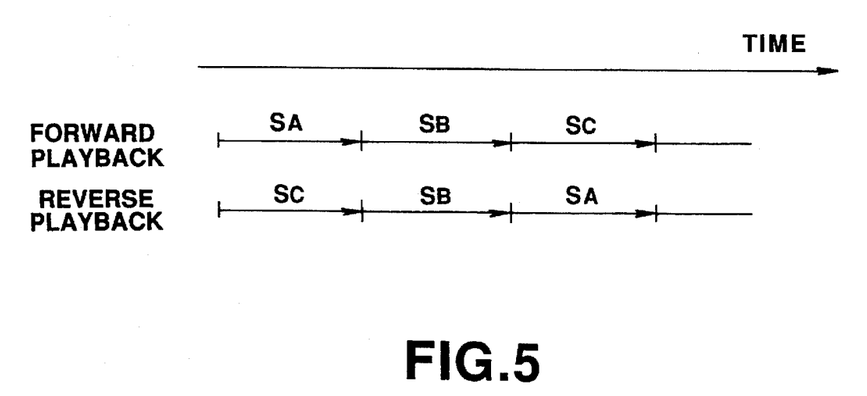
FIG. 5 is an explanatory view showing audio data segments with tape running directions.

Meanwhile, audio data are recorded on tape TP by segments $S_A$, $S_B$, $S_C$, as shown in FIG. 4, in which an arrow tr indicates the locus of tracing by DT head.

Consequently, the tracing sequence by the DT head during forward reproduction is segment $S_A \rightarrow S_B \rightarrow S_C$. However, the tracing sequence by the DT head during reverse reproduction is $S_C \rightarrow S_B \rightarrow S_A$. It is noted that the audio data are reproduced during reverse playback from segment to segment in the same arraying sequence as that for recording.

Figure 6:
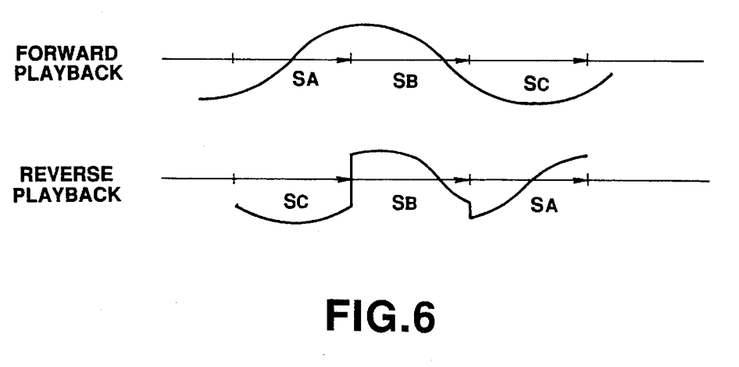
FIG. 6 is a waveform diagram for explaining memory writing problems.

The waveform of the voice signals during forward reproduction and reverse reproduction is shown in FIG. 6. That is, the voice signals during forward playback present a continuous waveform, whereas those during reverse playback present a discontinuous waveform.

Consequently, in the embodiment illustrated, the audio data are captured by memory 12 during reverse playback in such a manner that the audio data are captured from a value decremented from the address of the current location by a value corresponding to one field so that the last data of a field reverts to the current location. In the next field, an operation similar to that described above is carried out with the address of the write start point of a previous field as a reference. In the present embodiment, the 5-field sequence of the audio data is discriminated by the segment signal in the ID flag to calculate the amount of decrementation.

Figure 7:
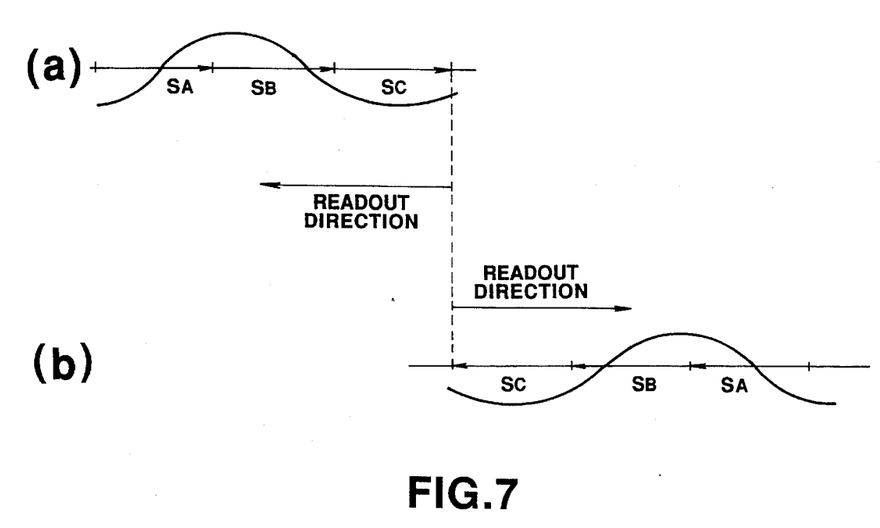
FIG. 7 is an explanatory view for memory reading and writing operations applied to the present invention.

On the other hand, the two methods shown in FIGS. 7a and 7b may be envisaged of writing audio data in memory 12 during reverse playback. In the present embodiment, for reverse playback, writing is performed in the forward direction as shown in FIG. 7a and reading is performed in the reverse direction.

It is noted that, if the audio data are read out during reverse playback while the data are being written in the memory 12, the audio data to be reproduced initially from the tape is written in memory 12 at the end of a field, so that one-field audio data is necessarily delayed as compared to the analog sound.

Besides, in the present embodiment, the 8th order Lagrange interpolation is carried out for writing the audio data in memory 12 and for reading the audio data from memory 12 during forward playback.

For carrying out the 8th order Lagrange interpolation, sound data between adjacent samples are produced from four fore samples and four aft samples, three dummy data are required for producing the first sound. Alternatively, it is necessary to shift the address by four samples and to carry out processing so that the shifted samples become the first data. In the latter case, the four samples at back of a point of field interruption need to be produced from the above-mentioned dummy data. In the latter case, the sound is interrupted because of the absence of data at back of the field interruption.

Figure 8:
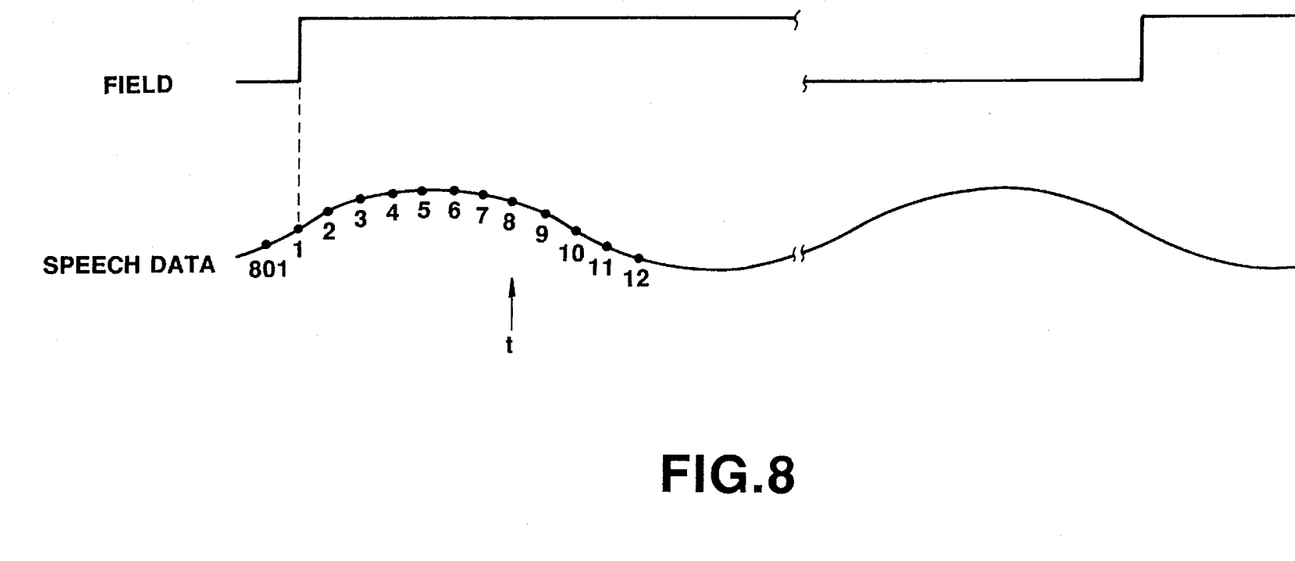
FIG. 8 is an explanatory view for a delay amount caused during reading from memory.

With these two methods, data dropout is compensated because the sound is generated on the real-time basis. If some delay, such as delay of four samples, is permitted in reading, no sound is produced until time t or for eight samples at the start time of sound production. However, the delay for the normal speed (x1 speed) playback becomes equal to 4-sample time. For x1/32 speed, the delay corresponds to 128 samples which is a constant delay quantity.

A more detailed construction of address generating means of DSP 11 (address controller 51 of FIG. 3), which enables the accessing of memory 12, is hereinafter explained.

Figure 9:
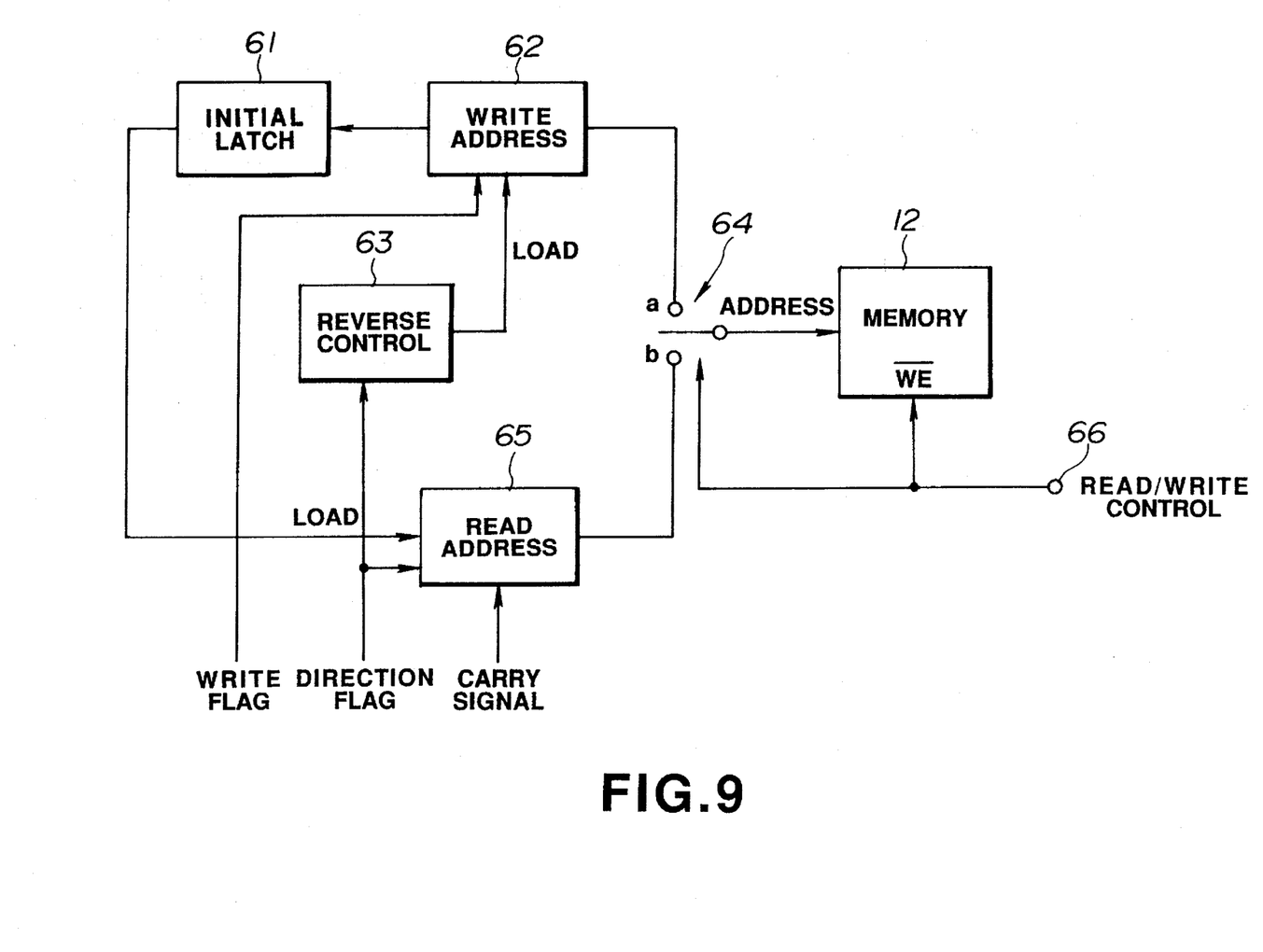
FIG. 9 is a block circuit diagram showing an arrangement of an address generator applied to the digital VTR according to the present invention.

DSP 11 of the present embodiment is so arranged and constructed that a counter 62 functioning as a write address generator is operated by 48 kHz clocks, and a counter 65 as the readout address generator is operated by carry signals outputted from speed data processor 54 for generating the write-read address, as shown in FIG. 9. Counter 62 generates a write address when the write flag is entered thereto. At the time of start of movement of a so-called jog dial used for differential speed reproduction, it is necessary to latch the first count value of the write address from counter 62 operated as write address generator in the latch circuit 61 so as to be used as a first load data of the readout address at the counter 65 operated as the readout address generator. The address data from counters 62, 65 are transmitted to fixed terminals a, b of a changeover switch 64, which is changed over responsive to read/write control signals from terminal 66, generated at a timing signal generator, not shown, so as to be transmitted via changeover switch 64 to an address input terminal of memory 12. The read/write control signal is also supplied as inverting signal to a write enable terminal of memory 12. Despite some time delay, the readout address is basically the same as the address used during writing.

It is to be noted that, in FIG. 9, address data previously counted down from a field to field is loaded from reverse control circuit 63 to counter 62, when the direction flag indicates the reverse direction, and the loaded address data are counted up to generate write addresses, for assuring audio data continuity in memory 12. At this time, counter 65 counts down the carry signal to generate readout addresses the address values of which are decremented, that is advanced in a direction opposite to that during forward playback.

Figure 10:
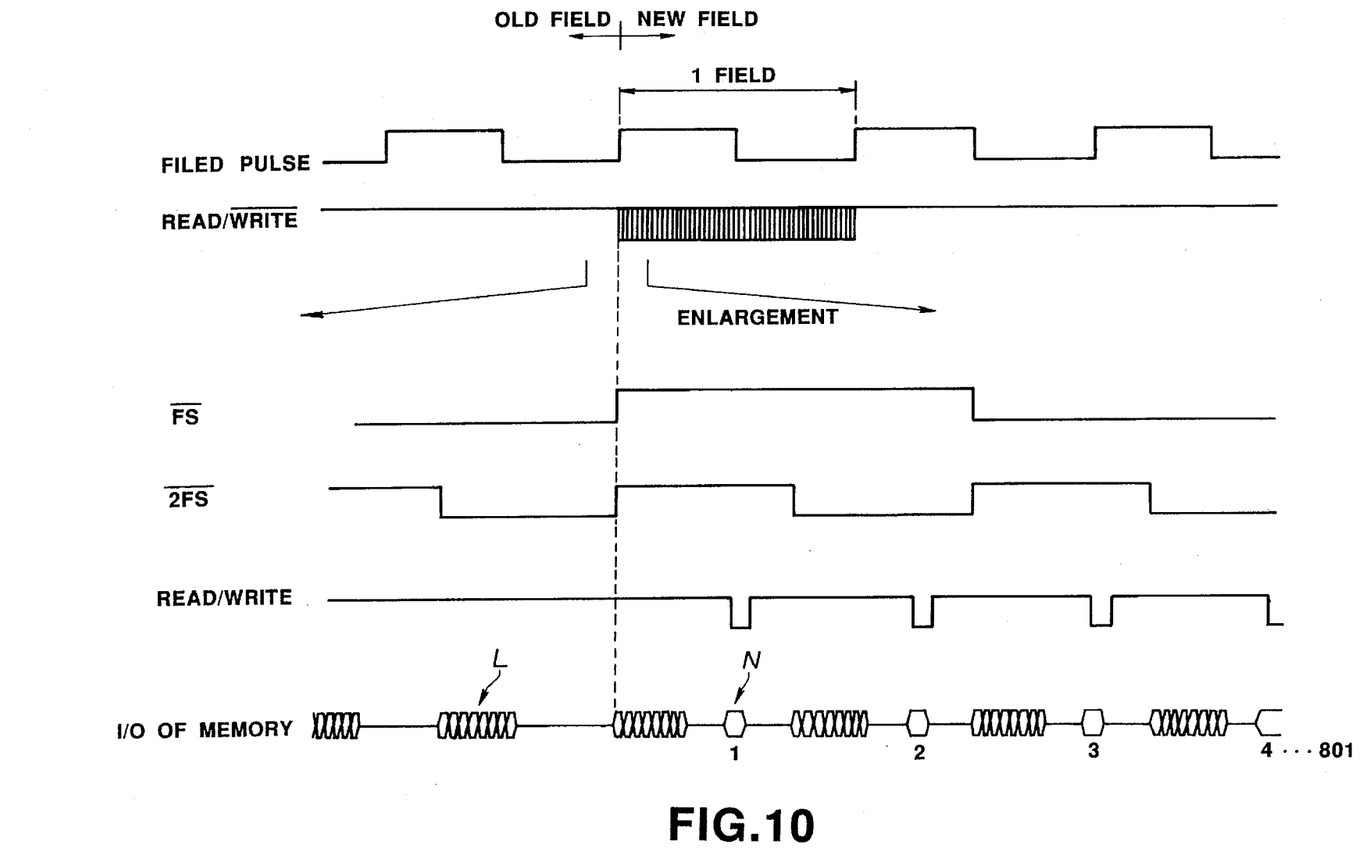
FIG. 10 is a waveform diagram for explaining timings for memory reading and writing and memory input/output applied to the digital VTR according to the present invention.

FIG. 10 shows timings of various signals and memory input/output during accessing of memory 12 in the instant apparatus. During transition from an old field to a new field, new data shown at N in FIG. 10 is written at I/O of memory 12 in addition to readout of the 8th order interpolation data, although solely the readout of the 8th order Lagrange interpolation data as shown at L occurred in the course of the old field at the I/O of memory 12, as shown in FIG. 10. It is noted that, if the field is found to be a new field, memory accessing occurs frequently because the write operation is now to be carried out in addition to the readout operation. However, such frequent accessing can be accommodated by using an S-RAM of recent origin.

Figure 11:
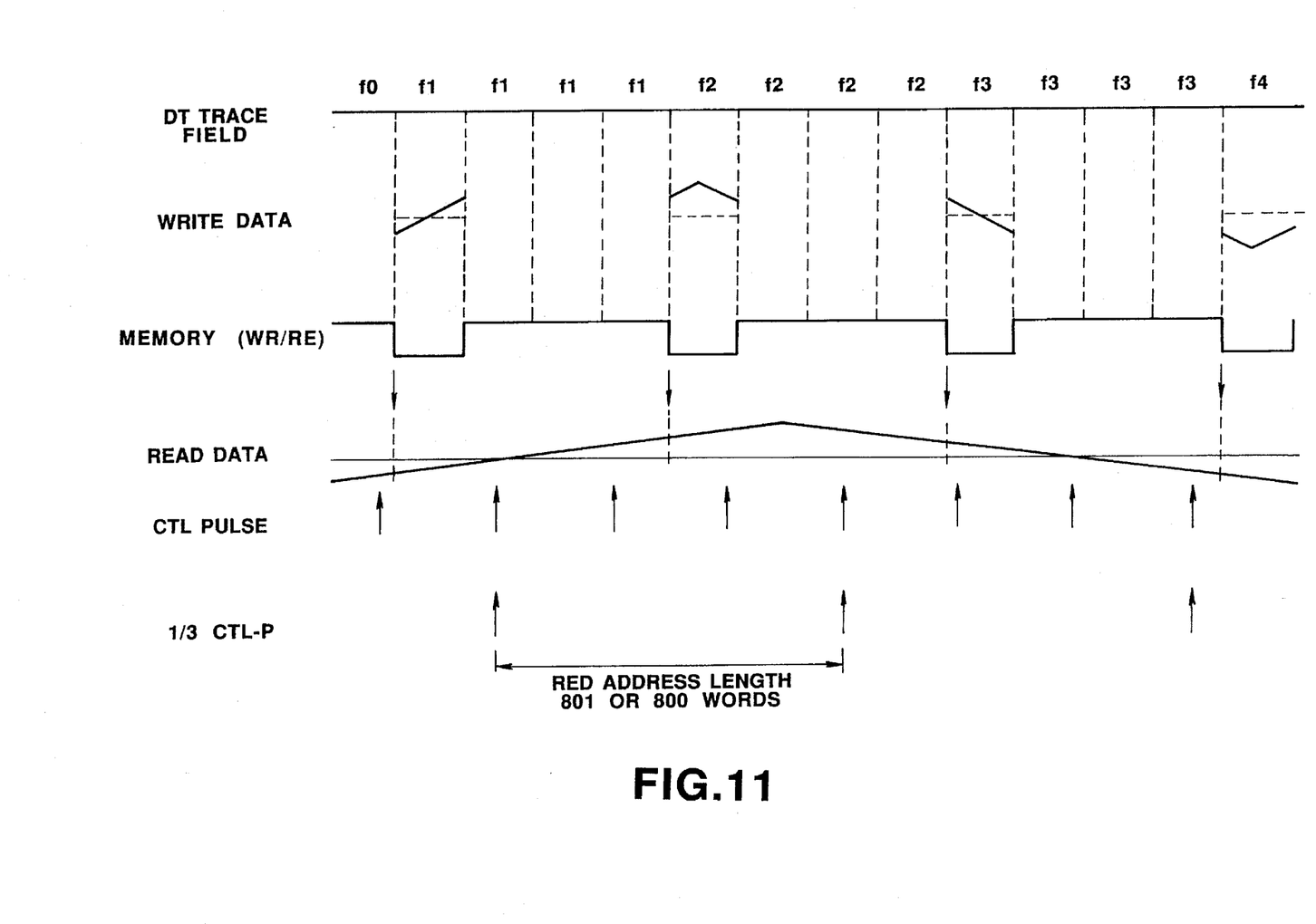
FIG. 11 is an explanatory view for explaining the fields, writing data and reading data for reverse playback in the digital VTR according to the present invention.

FIG. 11 shows fields traced by the DT head during forward playback at e.g. x1/4 speed, writing data in memory 12, write/read control signals to and from memory 12 and read-data from memory 12. In FIG. 11, CTL-P denotes a control (CTL) pulse generated with tape running at x1/4 speed at a rate of three pulses per field. For this tape running speed, DT head traces the field $f_1$ four times, then traces the field $f_2$ four times and so forth and only newly occurring fields in the course of tracing of the fields by the DT head are written as write data in memory 12. The writing direction in memory 12 at this time is from left to right for any waveforms of the write data.

The data written in memory 12 are sequentially read out in the sequence of $f_1, f_2, f_3, \ldots$ in the same direction as the writing direction at the readout speed conforming to the tape speed. The result is that read data are produced which have been time expanded depending on the tape speed. Meanwhile, the read address length is 801 or 800 words for three periods of the CTL pulses.

Figure 12:
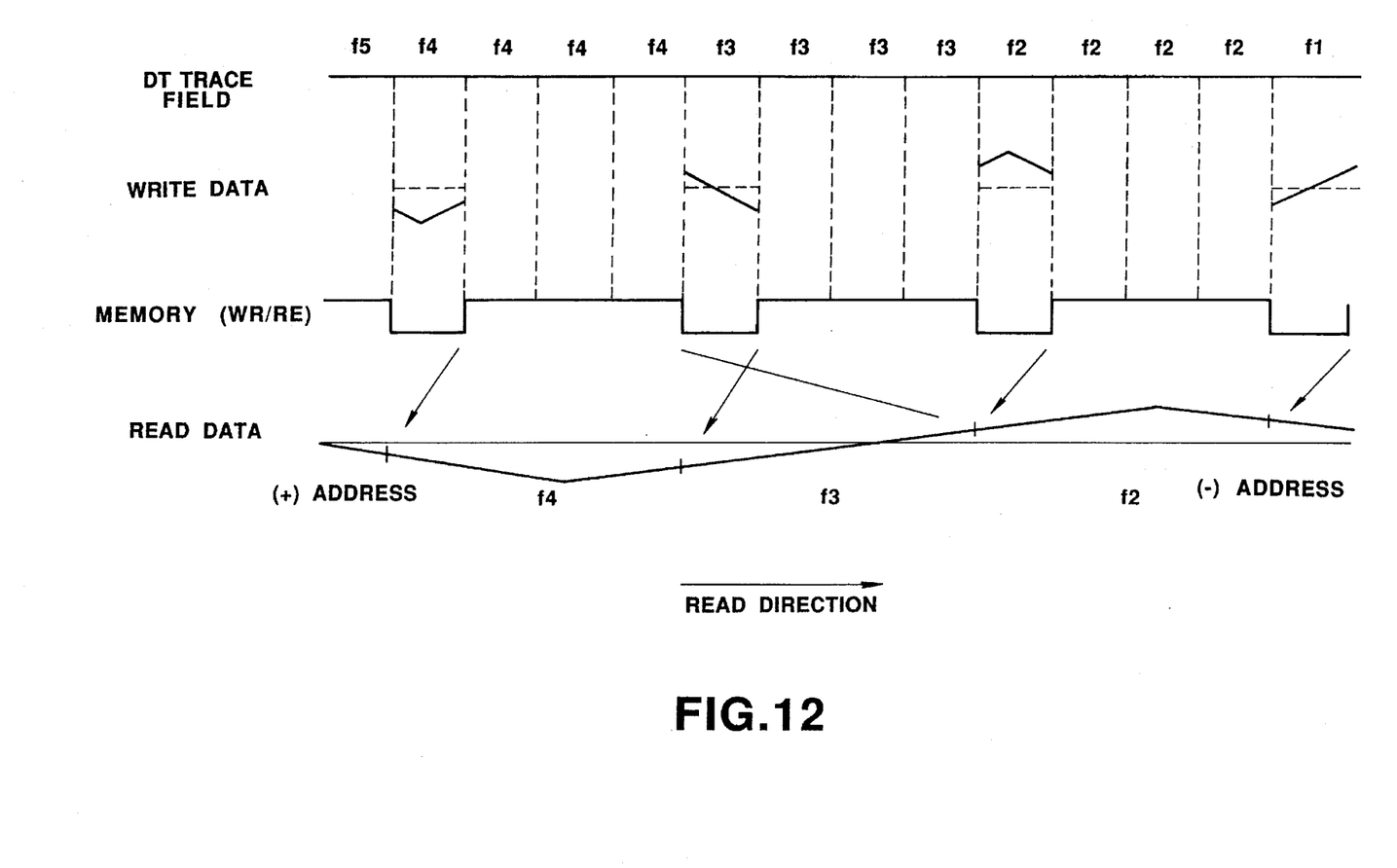
FIG. 12 is an explanatory view for explaining the fields, writing data and reading data for forward playback in the digital VTR according to the present invention.

FIG. 12 shows the fields traced by DT head during reverse playback at x1/4 speed, write data in memory 12, write/read control signals in memory 12 and read data from memory 12. In FIG. 12, since the tape is run in the reverse direction, DT head sequentially traces the fields $f_4, f_3$ and $f_2$ each four times in this order. Among the fields obtained by this tracing, only the fields that are newly presented are written as write data in memory 12. The writing direction in memory 12 in this case is the same as that for the forward tape running direction, that is from left to right. However, since each field is made up of plural tracks, the writing direction is reversed as far as the individual tracks in each field are concerned.

The data written in memory 12 are sequentially read out on the field-by-field basis in the sequence of $f_4, f_3, f_2, \ldots$, that is in the reverse direction to the writing direction, at the readout speed conforming to the tape speed. The result is that read data, which are time expanded depending on the tape speed and which have the time base of the signal waveform inverted, are produced.

It will be seen from above that the present invention provides an audio data reproducing apparatus for a digital VTR in which audio data obtained when a new track among audio data obtained from field to field or from frame to frame during slow playback is traced by the DT head is captured by memory 12, and audio data of sequentially new tracks are updated in memory 12, so that continuous sound is produced on memory 12. Besides, the audio data are read out from memory 12 at a rate conforming to the tape speed so as to be processed with Lagrange interpolation. In this manner, the voice is produced during slow playback at a rate conforming to the slow playback speed, and the voice is not produced during still playback.

Consequently, if the instant apparatus is employed in e.g. an editing system, audio data may be utilized as a cue to setting essential editing features.

What is claimed is:

1. An audio data reproducing apparatus for reproducing digital voice signals from slanted tracks formed on a magnetic tape, the digital voice signals being reproduced in a different speed playback mode wherein the magnetic tape is driven at a speed different than the tape speed at which the digital voice signals were recorded, comprising means for running said magnetic tape at said different playback speed, a playback rotary magnetic head adapted to be moved by a head moving unit in a direction of crossing said slanted tracks for effecting follow-up tracing of said slanted tracks for reproducing signals recorded on said slanted tracks even when said magnetic tape is run at said speed different than the recording speed, first memory means for storing said digital voice signals reproduced from said slanted tracks by said magnetic head on a block-by-block basis, write address generating means for generating, during the different speed playback mode, write address data to permit said digital voice signals recorded on the slanted tracks of a new frame traced by said playback rotary magnetic head to be written in said first memory means based on information signals indicating that said new track has been traced by said playback rotary magnetic head, readout address generating means for generating first readout address data to permit said digital voice signals stored in said first memory means during said different speed playback mode to be read out at a readout speed conforming to the different tape playback running speed, interpolating means for interpolating the audio data readout from said first memory means by said first readout address data in accordance with the tape playback running speed, second memory means for storing interpolation coefficients employed for interpolation, said interpolation coefficients conforming to the tape playback running speed, speed data forming means for forming speed data based on the tape playback running speed, write address data and the first readout address data, said speed data indicating the speed of reading out said digital voice signals from said first memory means, speed data processing means for generating, based on said speed data, pulse signals to enable generating said first readout address data and for generating second readout address data for enabling readout of said second memory means, flag generating means for generating a first flag responsive to an information signal indicating that said playback rotary magnetic head has traced a slanted track of a new block, said information signals being based on running position of said magnetic tape, and flag processing means for forming, based on said first flag, signals for generating the write address data for said first memory means.

2. The audio data reproducing apparatus as claimed in claim 1 wherein said speed data forming means correct said speed data, based on said write address data and said first readout address data, so that writing in said first memory means are not overlapped with readout from said first memory means.

3. The audio data reproducing apparatus as claimed in claim 1 wherein said flag generating means is also supplied with a signal indicating the running direction of said magnetic tape, said flag generating means generating a second flag responsive to said signal indicating the running direction of said magnetic tape, said write address generating means and said readout address generating means generating, on detection of said second flag by said flag processing means, write address data and first address data for data which is read out from said first memory means and, which has the chronological sequence reversed from that for the forward playback.

4. The audio data reproducing apparatus as claimed in claim 1 wherein said flag generating means is also supplied with signals indicating that said magnetic tape is run at a speed approximately equal to a normal playback speed, said flag generating means generating a third flag responsive to a signal indicating that said magnetic tape is run at a speed approximately equal to the normal playback speed, said readout address generating means generating, on detection of said third flag by said flag processing means, a first readout address of a fixed period based on said third flag.

5. The audio data reproducing apparatus as claimed in claim 1 wherein said flag generating means is also supplied with a signal indicating that said rotary magnetic head is tracing said slanted track, said flag generating means generating a fourth flag on detection of said signal indicating that said rotary magnetic head is tracing said slanted track, said flag processing means inhibiting outputting of said first flag on detection of said fourth flag.

6. The audio data reproducing apparatus as claimed in claim 1 wherein said second memory means stores interpolation coefficients for Lagrange interpolation.

7. A playback apparatus for reproducing digital audio signals which were recorded in successive parallel tracks extending obliquely across a magnetic tape while said tape was driven at a predetermined recording tape speed, said playback apparatus comprising:

means operative in a slow playback mode for driving said tape at a playback tape speed which is slower than said predetermined recording tape speed;

rotary playback head means for reproducing the recorded digital audio signals and including dynamic tracking means for displacing said head means in a direction across said tracks so as to cause said head means to closely follow each of said tracks in succession during repeated scannings of each of said tracks by said head means when said tape is driven at said playback tape speed slower than the recording tape speed;

memory means for storing digital audio signals reproduced by said rotary playback head means when scanning the respective tracks;

write address generating means operative in said slow playback mode for generating write address data by which said digital audio signals reproduced during only the first of said repeated scannings of said respective tracks are written in said memory means;

read out address generating means operative in said slow playback mode for generating read out address data by which said digital audio signals stored in said memory means in said slow playback mode are read out of said memory means at a rate conforming to said playback tape speed slower than said recording tape speed; and interpolating means operative in said slow playback mode for interpolating said digital audio signals read out from said memory means by said read out address data in accordance with said playback tape speed slower than the recording tape speed and thereby providing interpolated digital audio data interposed between the digital audio signals read out from said memory means.

* * * * *